United States Patent [19]
Steele et al.

[11] Patent Number: 5,982,455
[45] Date of Patent: Nov. 9, 1999

[54] SIGNAL PROCESSING SYSTEM

[75] Inventors: David Charles Steele, Marlborough; David Throup, Lockeridge, both of United Kingdom

[73] Assignee: Quantel Limited, Newberry

[21] Appl. No.: 08/835,711

[22] Filed: Apr. 10, 1997

[30] Foreign Application Priority Data

Apr. 17, 1996 [GB] United Kingdom .................... 9607910

[51] Int. Cl.⁶ .............................. H04N 5/208; H04N 9/64
[52] U.S. Cl. ............................................. 348/631; 348/426
[58] Field of Search .................................... 348/426, 631; H04N 9/64, 5/208

[56] References Cited

U.S. PATENT DOCUMENTS

| | | | |
|---|---|---|---|
| 3,778,543 | 12/1973 | Lowry | 348/631 |
| 4,514,818 | 4/1985 | Walker | 348/571 |
| 4,553,157 | 11/1985 | Hurst | 348/631 |
| 4,739,395 | 4/1988 | Johanndeiter et al. | 348/628 |
| 5,077,603 | 12/1991 | Macovski | 348/631 |
| 5,479,216 | 12/1995 | Reime | 348/631 |
| 5,515,112 | 5/1996 | Penney | 348/631 |

FOREIGN PATENT DOCUMENTS

| | | |
|---|---|---|
| 0224302 | 6/1987 | European Pat. Off. . |
| 0302500 | 2/1989 | European Pat. Off. . |
| 0340648 | 11/1989 | European Pat. Off. . |
| 0469892 | 2/1992 | European Pat. Off. . |
| 0705043 | 4/1996 | European Pat. Off. . |

*Primary Examiner*—Howard Britton
*Attorney, Agent, or Firm*—Cooper & Dunham LLP

[57] ABSTRACT

An image processing system 20 comprises a format converter 21 for receiving a first signal having a larger bandwidth and a second signal having a smaller bandwidth, the first and second signals together representing an image. A processor 23 is arranged to process the first and second signals to produce signals representing a manipulated version of the image. The system further comprises a deriving circuit 25 which is arranged to derive from information in the larger bandwidth signal additional information for the smaller bandwidth signal. The deriving circuit derives an unknown value of a pixel as represented by the smaller bandwidth signal from known values of the pixel and the pixels adjacent thereto as represented by the larger bandwidth signal and from known values of the adjacent pixels as represented by the smaller bandwidth signal. The deriving circuit facilitates conversion of the first and second signals into another signal format representing the image.

40 Claims, 5 Drawing Sheets

SIGNAL PROCESSING SYSTEM

The invention relates to a signal processing system. More specifically the invention relates to a signal processing system for processing a pair of signals carrying related information with one of the signals having a larger bandwidth and the other of the signals having a smaller bandwidth.

Images can be represented in an electrical environment by signals that define such image attributes as the intensity and colour of elements of the images. In the past, television pictures were represented by analog signals defining the luminance (Y) and the colour difference (R-Y) and (B-Y), ie chrominance, of the picture elements. More recently digital signals have been used to represent television pictures. Digital signals are highly resistant to degradation and can be readily processed to create special effects in the television picture.

In one digital standard, the so-called D1 standard, a component signal is used consisting of luminance (Y) and chrominance (U, V) signals that are sampled at a ratio of 4:2:2. The luminance signal is sampled at a rate of 13.5 MHz and the two chrominance signals are each sampled at a rate of 6.75 MHz. That is to say, the digital luminance signal has a bandwidth of 13.5 MHz and the digital chrominance signals each have a bandwidth of 6.75 MHz. The bandwidth is a measure of the detail in the picture. Sampling in the 4:2:2 ratio means that the horizontal resolution of the colour in the television picture is halved, but because it is the luminance that contains the picture detail this reduction in horizontal colour resolution is an acceptable compromise that enables the data rate to be reduced.

Figure 1:
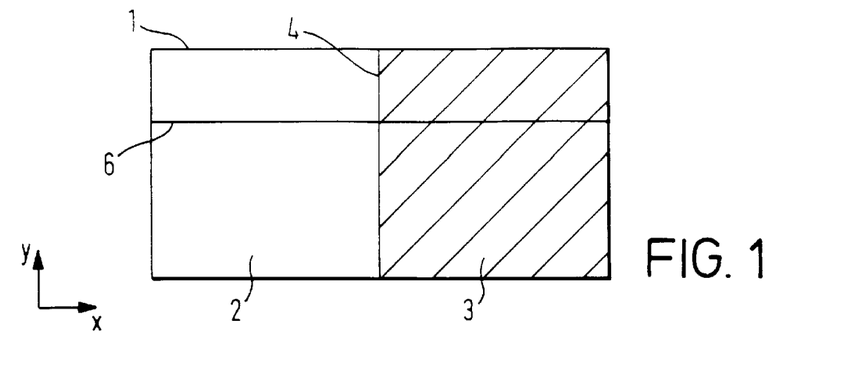
FIG. 1 illustrates a simple picture comprising two areas of different colours, as already described herein.
Figure 2:
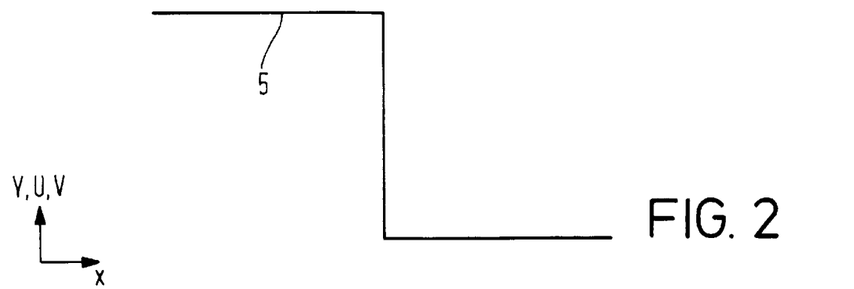
FIG. 2 shows a signal of infinite bandwidth representing a line in the picture of FIG. 1, as already described herein.
Figure 3:
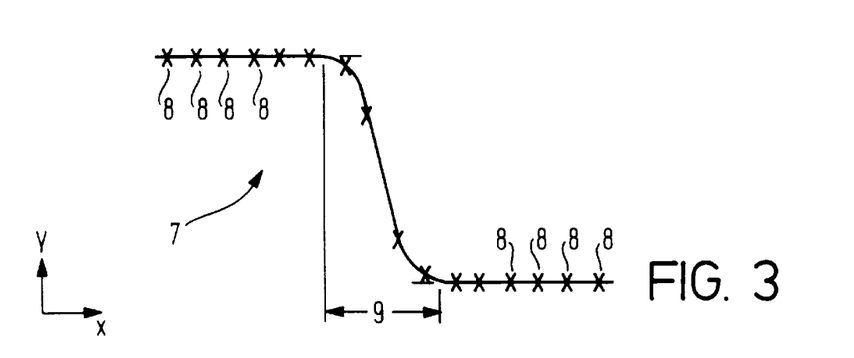
FIG. 3 shows a signal of finite bandwidth representing luminance of the line in FIG. 1, as already described herein.
Figure 4:
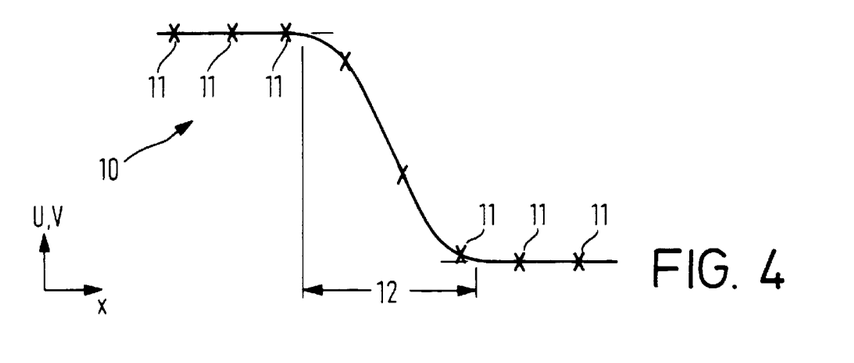
FIG. 4 shows a signal of reduced finite bandwidth representing the line in FIG. 1, as already described herein.

As a component signal, the D1 signal is well suited to studio and post-production work. However, under some circumstances unacceptable image degradation can occur as a direct consequence of the reduced chrominance bandwidth. FIG. 1 of the accompanying drawings illustrates a simple picture 1 comprising two areas of different colours 2, 3, say yellow and black, with an abrupt transition 4 between the two areas. FIG. 2 of the accompanying drawings shows a signal 5 of infinite bandwidth representing a line 6 in the picture 1. The infinite bandwidth of the signal 5 means that signal can represent exactly the transition 4 between the two areas 2, 3. Ideally, the luminance (Y) and chrominance (U, V) signals would represent the line 6 in this manner. However, this does not happen in practice because of the limited bandwidth of the signals. FIG. 3 of the accompanying drawings shows a luminance signal 7 comprising multiple sample values at evenly spaced intervals. The effect of limiting the bandwidth in the signal 7 is to produce a transitional zone 9 in the signal extending to each side of the boundary 4 in the picture. FIG. 4 of the accompanying drawings shows a signal 10 having half the bandwidth of the signal 7 and corresponding to one of the chrominance signals (U or B). The effect of halving the bandwidth of the signal 10 as compared to that of the signal 7 is to halve the number of sampling points 11 that comprise the signal 10 and to increase the size of the transitional zone 12 on each side of the boundary 4 in the picture.

When the picture represented by the luminance signal 7 and chrominance signals 10 is displayed on a monitor the boundary 4 between the two areas 2, 3 will not be seen as a sharp line but will instead be seen as a blurred region that may contain unwanted colours between yellow and black. In some situations, especially when the image is static as opposed to part of a video sequence, this blurring of the boundary 4 is unacceptable.

The invention aims to minimise the above problems.

According to one aspect of the invention there is provided a signal processing system for processing a pair of signals carrying related information with one of the signals having a larger bandwidth and the other of the signals having a smaller bandwidth, in which system additional information for the smaller bandwidth signal is derived from information in the larger bandwidth signal.

According to another aspect of the invention there is provided an image processing apparatus comprising: a source for supplying a first signal having a larger bandwidth and a second signal having a smaller bandwidth, the first and second signals together representing an image; a processor for processing the first and second signals to produce manipulated first and second signals which together represent a manipulated version of the image; and a deriving circuit for deriving from the information in the larger bandwidth signal additional information for the smaller bandwidth signal, and thereby facilitating conversion of the first and second signals into another format representing the image.

According to a further aspect of the invention there is provided a circuit for converting incoming signals, defining a multiplicity of pixels in one format comprising a first signal containing information for each pixel and a second signal containing information for every other pixel, into outgoing signals, defining said multiplicity of pixels in another format comprising plural signals each containing information for each pixel, the circuit comprising: a differential stage for determining a difference between a zeroth pixel value and a first pixel value in the first signal, and a difference between the zeroth pixel value and a second pixel value in the first signal; a divider stage or dividing the difference between the zeroth and first pixel values by the difference between the zeroth and second pixel values to produce a constant value; and a processing stage for calculating a value for the first pixel in the second signal from values for the zeroth pixel and the second pixel in the second signal depending on the constant value.

The above and further features of the invention are set forth with particularity in the appended claims and together with advantages thereof will become clearer from consideration of the following detailed description of exemplary embodiments of the invention given with reference to the accompanying drawings.

Figure 5:
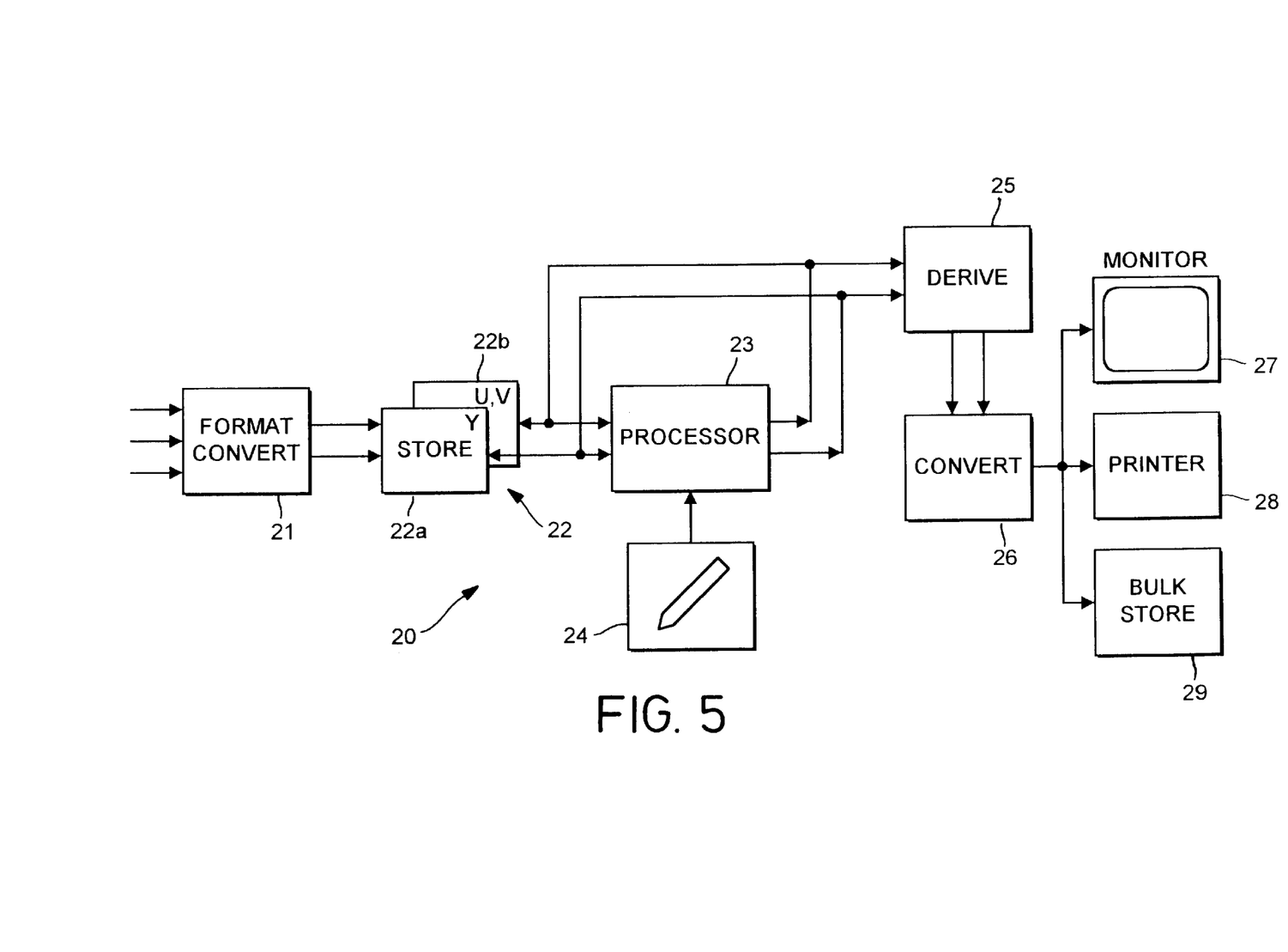
FIG. 5 is a schematic functional block diagram of a system embodying the invention.

Referring now to FIG. 5 of the drawings there is shown an image processing system 20 comprising a format converter 21 for receiving signals from an external source (not shown) and supplying signals to a store 22. The format converter 21 is provided to enable incoming signals to be supplied in any convenient format, eg RGB, CMYK, etc., and converted into a YUV format suitable for processing by the system. Format converters are per se well known and there is therefore no need to describe the format converter 21 in any further detail herein. The store 22 comprises two parts 22*a*, 22*b* respectively for storing data representing the luminance (Y) and chrominance (U, V) components of the data from the format convertor. The data in the store represents a multiplicity of pixels which together form a picture.

Figure 6:
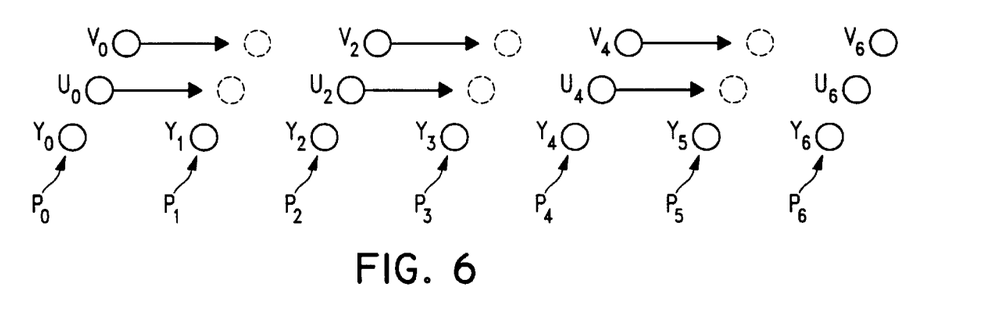
FIG. 6 shows pixels comprising luminance and chrominance data elements.

As shown in FIG. 6 of the accompanying drawings each pixel (pixel 0, pixel 1, pixel 2, etc.) has luminance data ($Y_0$, $Y_1$, $Y_2$, etc.) associated with it. Every other pixel (pixel 0, pixel 2, pixel 4, etc.) has chrominance data ($U_0$, $V_0$, $U_2$, $V_2$, $U_4$, $V_4$, etc.) associated with it. The chrominance data is shared between two pixels (e.g. pixel 0 and pixel 1) as already described herein above.

The system 20 further comprises a processor 23. The processor 23 is arranged to operate in the manner described in U.S. Pat. No. 4,514,818 and corresponding British Patent 2089625, the teachings of which are incorporated herein by reference, and the system therefore includes a stylus and touch tablet device 24 to which the processor 23 is responsive. The YUV data in the store 22 is in a format suitable for processing by the processor 23 as described in the above mentioned patents. Thus, the processor 23 is arranged to respond to user manipulation of the stylus and touch tablet device to read data from the store 22, modify the data and write the modified data back to the store 22 replacing the data originally stored therein. In this way, retouching of an image by electronic "painting" or "drawing" can be effected.

The system 20 further comprises a deriving circuit 25 connected to receive YUV data either directly from the store 22 or from the processor 23. As will be described in greater detail hereinafter, the deriving circuit 25 is arranged to derive additional information for the UV signals from the corresponding Y signals so as to provide separate UV data for each pixel in the picture. That is to say, as shown in FIG. 6, the deriving circuit 25 serves to derive UV data for pixel 1, pixel 3, pixel 5 etc. Data output from the deriving circuit 25 is received by another format converter 26 which converts the data into a desired format. For example, the format converter 26 may be arranged to convert the data into an RGB format for display of the image on a monitor 27, or it may be arranged to convert the data into a CMYK format for printing of the image by a printer 28. Of course, the converter 26 is not limited to converting into RGB or CMYK formats, and may for example be arranged to convert the data into the so-called D2 format for storage in a bulk store device such as a video tape recorder (VTR).

Figure 7:
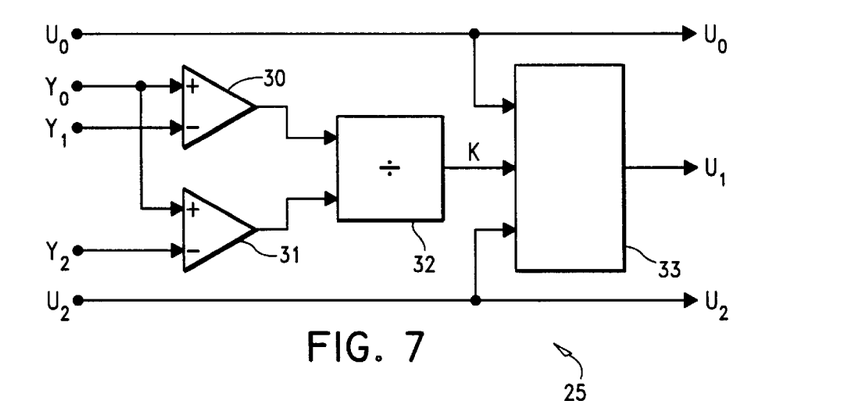
FIG. 7 shows details of a deriving circuit used in the system of FIG. 5.

FIG. 7 of the accompanying drawings shows the deriving circuit 25 in greater detail. The deriving circuit comprises two subtractors 30, 31 connected to receive luminance values $Y_0$, $Y_1$ and $Y_2$ for three adjacent pixels. The subtractor 30 is arranged to calculate the magnitude of the difference between $Y_0$ and $Y_1$, i.e. $|Y_1-Y_0|$. The subtractor 32 is arranged to calculate $|Y_2-Y_0|$. The values from the subtractors 30, 31 are input to a divider circuit which calculates a value K as the ratio of $|Y_1-Y_0|$ and $|Y_2-Y_0|$ that is to say, the divider calculates $$\frac{|Y_1 - Y_0|}{|Y_2 - Y_0|}.$$

The value output from the divider 32 is a constant value K, and it will be noted that the constant value K is calculated purely from the luminance values of consecutive pixels $Y_0$ to $Y_2$.

The constant value K is input to a selecting circuit 33 together with chrominance values $U_0$ and $U_2$ for the zeroth pixel and the second pixel in the sequence of three adjacent pixels. In the remainder of this description reference will be made only to the U values of the chrominance signals because the V values of the chrominance signals are treated in exactly the same way as the U values. The selector circuit 33 calculates from $U_0$, $U_2$ and K a value for use as the missing value for pixel 1, i.e. the selector calculates the value for $U_1$.

Figure 8:
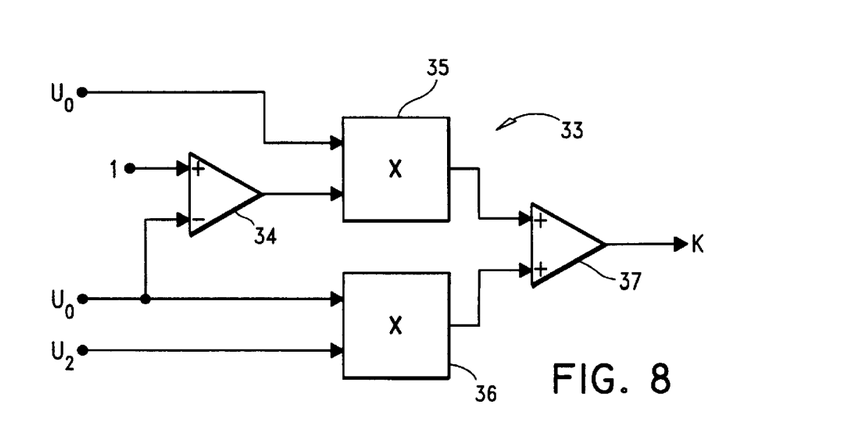
FIG. 8 shows a first embodiment of a selector circuit used in the deriving circuit of FIG. 7.

The selector 33 can be configured to work in two different modes. FIG. 8 of the accompanying drawings shows a first embodiment of the selector circuit 33 in greater detail. In this embodiment, the selector circuit 33 comprises a subtractor 34, two multipliers 35, 36 and an adder 37. The subtractor 34 is arranged to subtract the value K from a value corresponding to unity. The value (1–K) can therefore be said to be the inverse of the constant K. The chrominance value $U_0$ is input to the multiplier 35 together with the inverse constant (1–K) to produce the value $(1-K)U_0$. The chrominance value $U_2$ is input to the multiplier 36 together with the constant K to produce an output $KU_2$. The outputs from the multipliers 35 and 36 are input to the adder 37 which outputs the value corresponding to $U_1=(1-K)U_0+KU_2$. Thus, in this embodiment the selector 33 is arranged to derive the unknown chrominance value of pixel 1 from the known chrominance values of pixel 0 and pixel 2, both of which are adjacent to pixel 1, and from a constant K which, in turn, is derived from known luminance values of pixel 0, pixel 1 and pixel 2. The selector 33 thus calculates a value for U as a weighted summation of the values for $U_0$ and $U_2$.

Figure 9:
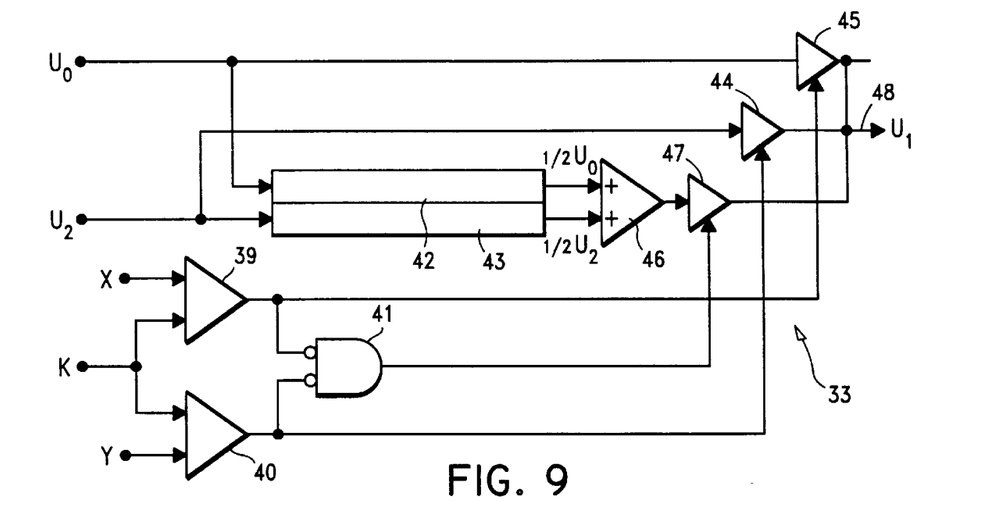
FIG. 9 shows a second embodiment of the selector circuit used in the deriving circuit of FIG. 7.

A second embodiment of the selector 33 is shown in FIG. 9 of the accompanying drawings. In this embodiment the selector 33 comprises a first comparator 39 which compares the value K with a predetermined value X and outputs a signal if K is less than X. The selector 33 further comprises a second comparator 40 which compares the constant value K with a predetermined value Y and outputs a signal if K is greater than Y. The signals output from the comparators 39, 40 are applied to inverting inputs of an AND circuit 41 which therefore outputs a signal if X<K<Y.

The chrominance signals $U_0$ and $U_2$ are input to a pair of shift registers 42, 43 and to respective tristate buffers 44, 45. The shift registers also receive the output from the AND circuit 41. In response to the AND circuit 41 outputting a signal the shift registers 42, 43 shift the digital values $U_0$, $U_2$ one place to the left, that is the shift registers divide both the digital value $U_0$ and the digital value $U_2$ by two. The chrominance data output from the two shift registers is added together by an adder 46 which outputs a value equal to ½ $U_0$+½ $U_2$. The output from the adder 46 is applied to a tristate buffer 47. The outputs from the tristate buffers 44, 45 and 47 are connected together at line 48. The tristate buffer 44 is driven by the output from the first comparator 39 and the tristate buffer 45 is driven by the output from the second comparator 40. The value $U_1$ output on line 48 is $U_0$ if K is less than X, is $U_2$ if K is greater than Y and is $\frac{1}{2} U_0 + \frac{1}{2} U_2$ if X<K<Y.

Any value between 0 and 1 can of course be selected for X and Y, but in practice values of X=¼ and Y=¾ work well. These values of X and Y give equal spacing between known and unknown pixels in the calculation.

Figure 10:
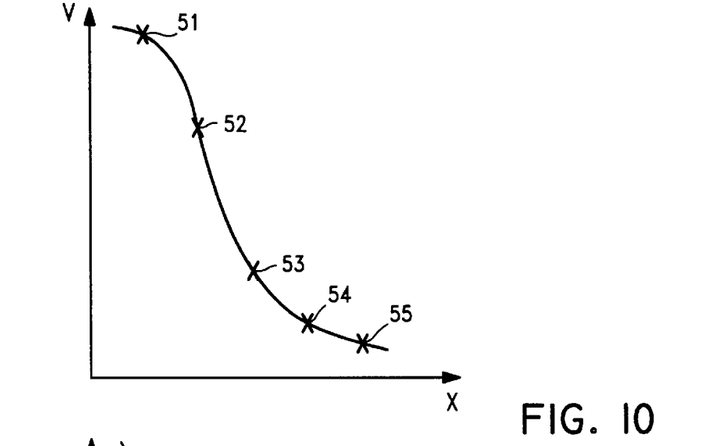
FIG. 10 is a graph showing a portion of a luminance signal.
Figure 11:
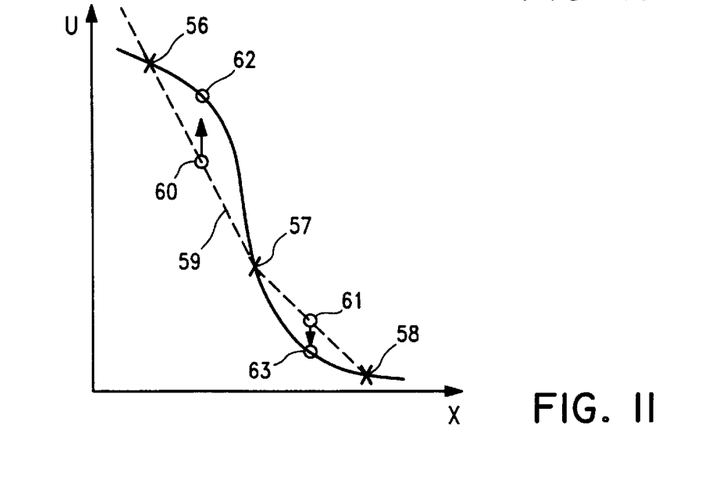
FIG. 11 is a graph showing a corresponding portion of a chrominance signal.

The effect of calculating unknown chrominance values in the drive circuit 25 as above described is illustrated in FIGS. 10 and 11 of the accompanying drawings. FIG. 10 shows how the luminance (Y) signal changes with distance (x) along a line in a picture. The luminance signal comprises plural samples 51 to 55 at equally spaced intervals along the line. The chrominance signal likewise comprises a plurality of evenly spaced samples 56 to 58, but the spacing between samples is twice that in the luminance signal. If one were simply to take as the unknown luminance value the average between two known values one would develop a signal represented by the broken line 59 in FIG. 11. The broken line 59 comprises unknown luminance samples 60, 61 which are taken to lie on a straight line between adjacent samples 56, 57 and 57, 58. The true values of the unknown samples is represented by points 62 and 63 and it should be noted that there is a considerable difference between the true value 62 and the calculated average value 60 and between the true value 63 and the calculated average value 61.

It will also be noted that the form of the luminance signal in FIG. 10 is similar (albeit not identical) to that of the chrominance signal in FIG. 11. The deriving circuit derives unknown pixel values using a constant calculated from the slope of the luminance signal. The effect of the calculation is therefore to produce unknown chrominance values such that the slope of the chrominance signal about the unknown chrominance value tends to follow the slope of the luminance signal at the corresponding point.

Figure 12:
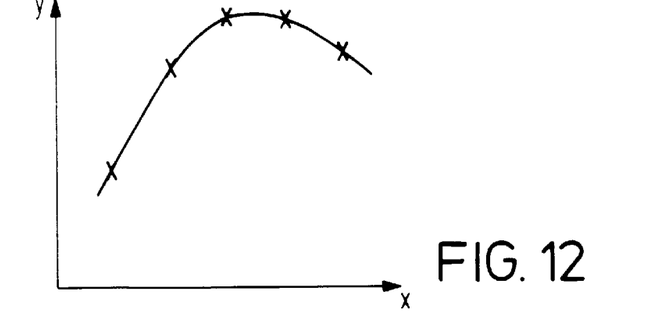
FIG. 12 is a graph showing a portion of a luminance signal.
Figure 13:
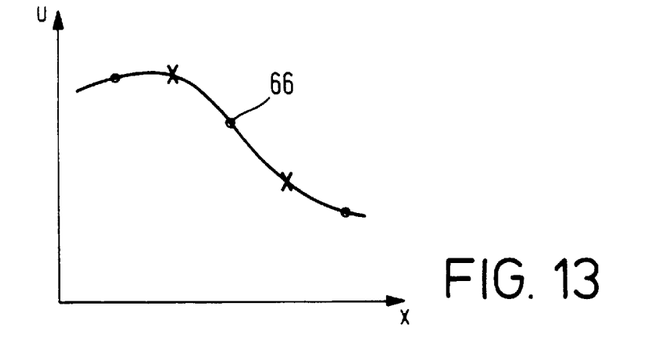
FIG. 13 is a graph showing a corresponding portion of a chrominance signal.

FIGS. 12 and 13 of the accompanying drawings show a special case where an unknown chrominance value is at a position corresponding to a peak in the luminance signal. In this situation the deriving circuit 25 is reconfigured to the arrangement shown in FIG. 14 of the accompanying drawings.

Figure 14:
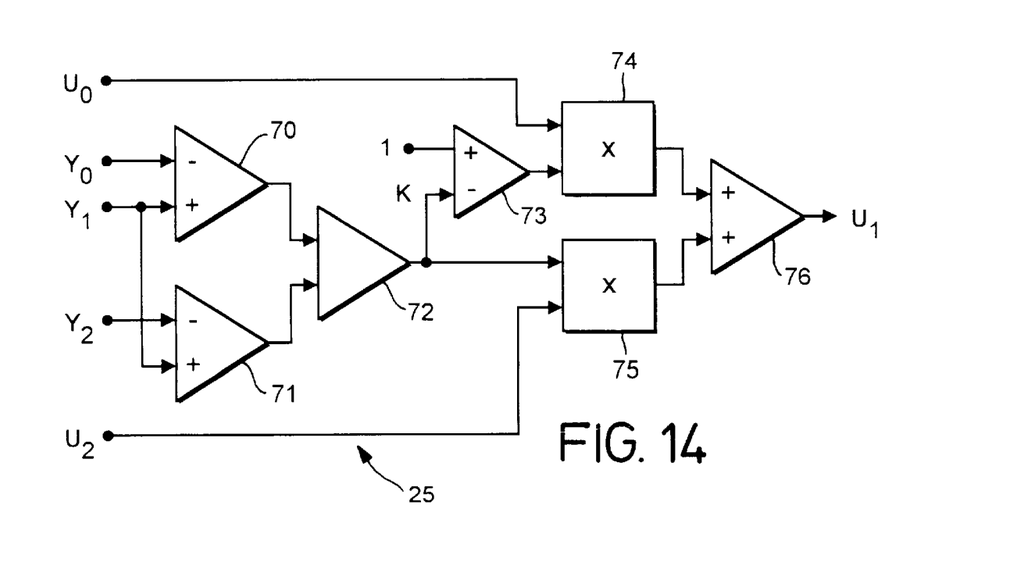
FIG. 14 shows another configuration of the deriving circuit.

Difference values between $Y_1$ and $Y_0$ and between $Y_1$ and $Y_2$ are calculated by way of subtractors 70, 71. The difference values output from the subtractors 70, 71 are compared by comparator 72 which is arranged to output a value K=0 if the difference between $Y_1$ and $Y_0$ is less than the difference between $Y_1$ and $Y_2$, and to output a value K=1 if the difference between $Y_1$ and $Y_0$ is greater than the difference between $Y_1$ and $Y_2$. The value K is input to a subtractor 73 which calculates the inverse value (1−K).

The values K and (1−K) are applied to respective multipliers 74, 75 together with values for $U_0$ and $U_2$. The signals output from the multiplier 74, 75 are added together by way of an adder 76 whose output corresponds to the value for $U_1$. The effect of setting K either to 0 or to 1 is to cause the deriving circuit shown in FIG. 14 to select either the value $U_0$ or the value $U_2$ as the value for $U_1$.

It will be appreciated from consideration of FIG. 14 and the foregoing description that the value that is chosen for U is the nearest of the values $U_0$ and $U_2$. It will also be appreciated by those possessed of the appropriate skills that the FIG. 14 circuit is equally applicable to calculating chrominance values in the vicinity of a trough or minimum in the luminance signal.

Having thus described the present invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

We claim:

1. A signal processing system for processing a pair of signals carrying related information with one of the signals having a larger bandwidth and the other of the signals having a smaller bandwidth and each of the signals representing the information as a sequence of discrete data points, in which system an unknown data point at an instant of time in the smaller bandwidth signal is derived by referring to known data points in the larger bandwidth signal in a period of time surrounding the instant of the unknown data point in the smaller bandwidth signal and to known data points in the smaller bandwidth signal and by determining a difference in values between the known data points in the larger bandwidth signal, comparing the difference with a first predetermined value, and selecting as the value of the unknown data point that of the known data point preceding the unknown data point in the lower bandwidth signal if the difference is less than the first predetermined value, whereby additional information for the smaller bandwidth signal is derived from information in the larger bandwidth signal.

2. A signal processing system as claimed in claim 1, wherein the unknown data point is derived by determining differences in values between the known data points in the larger bandwidth signal and using the differences to interpolate between known data points in the smaller bandwidth signal.

3. A signal processing system as claimed in claim 1, wherein the value of the unknown data point is selected to be that of the known data point succeeding the unknown data point in the lower bandwidth signal if the difference is greater than the first predetermined value.

4. A signal processing system as claimed in claim 1, wherein the unknown data point is derived by comparing the difference with a second predetermined value and selecting as the value of the unknown data point that of the known data point succeeding the unknown data point in the lower bandwidth signal if the difference is greater than the second predetermined value.

5. A signal processing system as claimed in claim 4, wherein the value of the unknown data point is derived by averaging the values of the preceding data point and the succeeding data point if the difference is greater than the first predetermined value and less than the second predetermined value.

6. A signal processing system as claimed in claim 5, wherein the difference is normalized and the predetermined values are selected to be in the value range zero to unity.

7. A signal processing system as claimed in claim 6, wherein the first predetermined value is selected to be 0.25 and the second predetermined value is selected to be 0.75.

8. A signal processing system as claimed in claim 1, wherein the signals represent an image.

9. A signal processing system as claimed in claim 8, wherein the larger bandwidth signal is a luminance signal and the smaller bandwidth signal is a chrominance signal.

10. A signal processing system as claimed in claim 1, wherein the larger bandwidth signal has a bandwidth at least twice that of a smaller bandwidth signal.

11. An image processing apparatus comprising:
 a source for supplying a first signal having a larger bandwidth and a second signal having a smaller bandwidth, the first and second signals together representing an image as discrete pixels;

a processor for processing the first and second signals to produce manipulated first and second signals which together represent a manipulated version of the image; and a deriving circuit for deriving from the information in the larger bandwidth signal additional information for the smaller bandwidth signal by deriving an unknown value of a pixel as represented by the smaller bandwidth signal from known values of the pixel and pixels adjacent thereto as represented by the larger bandwidth signal and from known values of the adjacent pixels as represented by the smaller bandwidth signal, and by determining a difference in values between the known pixels in the larger bandwidth signal, comparing the difference with a first predetermined value, and selecting as the value of the unknown pixel that of the known pixel preceding the unknown pixel in the lower bandwidth signal if the difference is less than the first predetermined value, the apparatus thereby facilitating conversion of the first and second signals into another format representing the image.

12. An image processing apparatus as claimed in claim 11, wherein the deriving circuit is arranged to select the value of the unknown pixel to be that of the known pixel succeeding the unknown pixel in the lower bandwidth signal if the difference is greater than the first predetermined value.

13. An image processing apparatus as claimed in claim 11, wherein the deriving circuit is arranged to derive the unknown pixel value by comparing the difference with a second predetermined value and selecting as the value of the unknown pixel that of the known pixel succeeding the unknown pixel in the lower bandwidth signal if the difference is greater than the second predetermined value.

14. An image processing apparatus as claimed in claim 13, wherein the deriving circuit is arranged to derive the unknown pixel value by averaging the values of the preceding and succeeding pixels if the difference is greater than the first predetermined value and less than the second predetermined value.

15. An image processing apparatus as claimed in claim 11, wherein the larger bandwidth signal represents the luminance of the image and the smaller bandwidth signal represents the chrominance of the signal.

16. An image processing apparatus as claimed in claim 11, further comprising a converter for converting signals output from the deriving circuit into signals in another format representing the image.

17. An image processing apparatus as claimed in claim 16, further comprising a monitor, and wherein the converter is operable to convert the signals from the deriving circuit into a format suitable for display of the image on the monitor.

18. An image processing apparatus as claimed in claim 16, further comprising a printer, and wherein the converter is operable to convert the signals from the deriving circuit into a format suitable for printing of the image by the printer.

19. An image processing apparatus as claimed in claim 11, wherein the source comprises a store, and the process is operable to read said first and second signals for selected pixels from the store for manipulation thereof and to write said manipulated first and second signals to the store replacing the first and second signals represented by the selected pixels previously stored therein.

20. An image processing apparatus as claimed in claim 11, further comprising a user operable input device, and wherein the processor is responsive to user manipulation of the input device to effect said processing.

21. A circuit for converting incoming signals, defining a multiplicity of pixels in one format comprising a first signal containing information for each pixel and a second signal containing information for every other pixel, into outgoing signals, defining said multiplicity of pixels in another format comprising plural signals each containing information for each pixel, the circuit comprising:

a differential stage for determining a difference between a zeroth pixel value and a first pixel value in the first signal, and a difference between the zeroth pixel value and a second pixel value in the first signal;

a divider stage for dividing the difference between the zeroth and first pixel values by the difference between the zeroth and second pixel values to produce a constant value; and a processing stage for calculating a value for the first pixel in the second signal from values for the zeroth pixel and the second pixel in the second signal depending on the constant value.

22. A circuit as claimed in claim 21, wherein the processing stage comprises a subtractor for calculating from the constant value an inverse constant value; a first multiplier for multiplying the zeroth pixel value in the second signal by the inverse constant value to produce a first intermediate value; a second multiplier for multiplying the second pixel value in the second signal by the constant value to produce a second intermediate value; and an adder for adding the first and second intermediate values together to produce the value for the first pixel in the second signal.

23. A circuit as claimed in claim 21, wherein the processing stage comprises a first comparator for comparing the constant value with a first predetermined value to determine whether the first predetermined value is greater than the constant value; a second comparator for comparing the constant value with a second predetermined value to determine whether the constant value is greater than the second predetermined value; and a selector for selecting as the value of the first pixel in the signal the value of the zeroth pixel in response to a true output from the first comparator and the value of the second pixel in response to a true output from the second comparator.

24. A circuit as claimed in claim 23, wherein the selector comprises an AND circuit responsive to a false output from both the first comparator and the second comparator; a shift register responsive to the AND circuit for dividing by two the values of the zeroth pixel and the second pixel in the second signal; and an adder for adding together the two divided values from the shift register to produce the value for the first pixel in the second signal.

25. A circuit as claimed in claim 24, wherein the selector further comprises means for selecting either the value of the zeroth pixel, the value of the second pixel or the value produced by the adder as the value of the first pixel in the second signal depending on the constant value as compared with the first and second predetermined values.

26. A signal processing apparatus for processing a pair of signals carrying related information wherein one of the signals has a larger bandwidth and the other of the signals has a smaller bandwidth and each of the signals represents the information as a respective sequence of discrete data points, the apparatus comprising:

a differencing circuit for determining differences in values between successive data points in the larger bandwidth signal and producing values representative of said differences;

a deriving circuit for deriving from the difference values a derived value; and a determining circuit for determining from the derived value and successive known data points in the smaller bandwidth signal a value for an unknown data point in the smaller bandwidth signal between the known data points, whereby additional information for the smaller bandwidth signal is derived from information in the larger bandwidth signal.

27. A signal apparatus as claimed in claim 26, wherein the differencing circuit comprises:

a first subtractor for determining a difference between a zeroth data point and a first data point in the larger bandwidth signal and outputting a value representative thereof; and a second subtractor for determining a difference between the zeroth data point and a second data point in the larger bandwidth signal and outputting a value representative thereof.

28. A signal processing apparatus as claimed in claim 27, wherein the deriving circuit comprises a dividing circuit connected to the first and second subtractors for dividing the output from the first subtractor by that output by the second subtractor to produce said derived value.

29. A signal processing apparatus as claimed in claim 27, wherein the deriving circuit comprises a comparator for comparing the values output from the first and second subtractors and producing said derived value depending on said comparison.

30. A signal processing apparatus as claimed in claim 26, wherein the determining circuit comprises an interpolator for interpolating between known data points in the smaller bandwidth signal depending on the derived value.

31. A signal processing apparatus as claimed in claim 26, wherein the determining circuit comprises a first comparator for comparing the derived value with a first predetermined value, and selecting as the value of the unknown data point that of the known data point preceding the unknown data point in the lower bandwidth signal if the derived value is less than the first predetermined value.

32. A signal processing apparatus as claimed in claim 31, wherein the determining circuit comprises a selector for selecting the value of the unknown data point to be that of the known data point succeeding the unknown data point in the lower bandwidth signal if the derived value is greater than the first predetermined value.

33. A signal processing apparatus as claimed in claim 32, wherein:

the determining circuit comprises a second comparator for comparing the derived value with a second predetermined value; and the selector is arranged to select as the value of the unknown data point that of the known data point succeeding the unknown data point in the lower bandwidth signal if the derived value is greater than the second predetermined value.

34. A signal processing apparatus as claimed in claim 33, wherein the determining circuit is arranged to determine the value of the unknown data point by averaging the values of the preceding data point and the succeeding data point if the derived value is greater than the first predetermined value and less than the second predetermined value.

35. A signal processing apparatus as claimed in claim 33, wherein the derived value is normalized and the first and second predetermined values are selected to be in the value range zero to unity.

36. A signal processing apparatus as claimed in claim 35, wherein the first predetermined value is selected to be 0.25 and the second predetermined value is selected to be 0.75.

37. A signal processing apparatus as claimed in claim 26, wherein the signals represent an image.

38. A signal processing apparatus as claimed in claim 37, wherein the larger bandwidth signal is a luminance signal and the smaller bandwidth signal is a chrominance signal.

39. A signal processing apparatus as claimed in claim 26, wherein the larger bandwidth signal has a bandwidth at least twice that of a smaller bandwidth signal.

40. A method of processing a pair of signals carrying related information wherein one of the signals has a larger bandwidth and the other of the signals has a smaller bandwidth and each of the signals represents the information as a respective sequence of discrete data points, the method comprising:

determining differences in values between successive data points in the larger bandwidth signal;

producing values representative of said differences;

deriving from the difference values a derived value; and determining from the derived value and successive known data points in the smaller bandwidth signal a value for an unknown data point in the smaller bandwidth signal between the known data points, whereby additional information for the smaller bandwidth signal is derived from information in the larger bandwidth signal.

* * * * *

UNITED STATES PATENT AND TRADEMARK OFFICE
CERTIFICATE OF CORRECTION

PATENT NO.   : 5,982,455
DATED        : November 9, 1999
INVENTOR(S)  : David Charles Steele and David Throup It is certified that error appears in the above-identified patent and that said Letter Patent is hereby corrected as shown below:

Cover page, item [73], please change "Quantel Limited, Newberry" to --Quantel Limited, Newbury, Berkshire--

Signed and Sealed this

Sixth Day of March, 2001

Attest:

NICHOLAS P. GODICI

Attesting Officer

Acting Director of the United States Patent and Trademark Office